United States Patent
Hodson

(10) Patent No.: US 11,277,966 B2
(45) Date of Patent: Mar. 22, 2022

(54) CALIBRATION SYNCHRONIZATION FOR MACHINE AND IMPLEMENT

(71) Applicant: Deere & Company, Moline, IL (US)

(72) Inventor: Michael J. Hodson, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 377 days.

(21) Appl. No.: 16/452,950

(22) Filed: Jun. 26, 2019

(65) Prior Publication Data

US 2020/0404841 A1 Dec. 31, 2020

(51) Int. Cl.
*A01D 41/127* (2006.01)

(52) U.S. Cl.
CPC .................. *A01D 41/127* (2013.01)

(58) Field of Classification Search
None
See application file for complete search history.

(56) References Cited

U.S. PATENT DOCUMENTS

| | | | | |
|---|---|---|---|---|
| 6,236,924 B1 * | 5/2001 | Motz | .................. | A01B 69/008 172/4.5 |
| 7,738,979 B2 | 6/2010 | Schmuck et al. | | |
| 8,401,744 B2 | 3/2013 | Chiocco | | |
| 2004/0024510 A1 * | 2/2004 | Finley | .................. | G05B 19/042 701/50 |
| 2004/0054457 A1 | 3/2004 | Kormann | | |
| 2012/0256843 A1 * | 10/2012 | Epple | .................. | A01D 41/127 345/169 |
| 2018/0312202 A1 * | 11/2018 | Racchella | .......... | B62D 33/0608 |

(Continued)

FOREIGN PATENT DOCUMENTS

| | | | | |
|---|---|---|---|---|
| DE | 102011120884 A1 * | 6/2013 | ............. | A01B 59/00 |
| DE | 102015114569 A1 * | 3/2017 | ............. | A01B 69/00 |
| EP | 1378863 A1 | 1/2004 | | |

(Continued)

OTHER PUBLICATIONS

European Search Report issued in counterpart application No. 20181939.8 dated Nov. 24, 2020 (10 pages).

(Continued)

*Primary Examiner* — Maceeh Anwari
*Assistant Examiner* — Jacob Daniel Underbakke
(74) *Attorney, Agent, or Firm* — Michael Best & Friedrich LLP

(57) ABSTRACT

Systems and methods for calibrating a machine for operating with an implement that is selectively coupleable to the machine. Both the implement and the machine have memories storing calibration data for machine-implement combinations. The machine and the implement are operated based on a calibration value stored to the machine memory corresponding to an identification of the specific implement that is coupled to the machine. If a calibration value for the specific implement is not already in the machine memory, the machine determines a calibration value for the implement based on other calibration data stored by the machine memory and/or the implement memory. In some embodiments, the calibration data stored by the machine and by the implement is synchronized when the implement is selectively coupled to the machine.

12 Claims, 6 Drawing Sheets

(56) References Cited

U.S. PATENT DOCUMENTS

2019/0085785 A1\* 3/2019 Abolt ................... G06Q 20/02

FOREIGN PATENT DOCUMENTS

| EP | 2712493 A1 \* | 4/2014 | ............. A01B 71/02 |
| EP | 2712493 A1 | 4/2014 | |
| EP | 2712494 A1 \* | 4/2014 | ........... A01B 79/005 |
| EP | 2712494 A1 | 4/2014 | |
| EP | 2733680 A1 | 5/2014 | |
| WO | WO2013083312 A1 | 6/2013 | |

OTHER PUBLICATIONS

AEF, "The AEF ISOBUS," <https://www.aef-online.org/the-aef/isobus.html#/About>, web page publicly available at least as early as Oct. 12, 2017.

\* cited by examiner

| Machine Table - Machine ID 3, Type A | | | |
|---|---|---|---|
| Implement ID | Implement Type | Calibration ID | Calibration Value |
| 1 | A | 1 | 1.1 |
| 1 | A | 2 | 3.1 |
| 2 | A | 2 | 2.7 |
| 3 | B | 1 | 5 |
| 4 | A | 1 | 0.9 |
| 5 | B | 2 | 4.875 |

FIG. 2A

| Implement Table - Implement ID 3, Type B | | | |
|---|---|---|---|
| Machine ID | Machine Type | Calibration ID | Calibration Value |
| 1 | A | 1 | 4.87 |
| 2 | B | 1 | 17 |
| 3 | A | 1 | 5 |

FIG. 2B

| Machine Table - Machine ID 3, Type A | | | |
|---|---|---|---|
| Implement ID | Implement Type | Calibration ID | Calibration Value |
| 1 | A | 1 | 0.9 |
| 3 | A | 1 | 1.1 |
| 4 | B | 1 | 5 |

*FIG. 8A*

| Implement Table - Implement ID 2, Type B | | | |
|---|---|---|---|
| Machine ID | Machine Type | Calibration ID | Calibration Value |
|  |  |  |  |
|  |  |  |  |
|  |  |  |  |

*FIG. 8B*

| Machine Table - Machine ID 3, Type A | | | |
|---|---|---|---|
| Implement ID | Implement Type | Calibration ID | Calibration Value |
| 1 | A | 1 | 0.9 |
| 2 | B | 1 | 5 |
| 3 | A | 1 | 1.1 |

*FIG. 7A*

| Implement Table - Implement ID 2, Type B | | | |
|---|---|---|---|
| Machine ID | Machine Type | Calibration ID | Calibration Value |
| 1 | A | 1 | 4.87 |
| 2 | B | 1 | 17 |
| 3 | A | 1 | 5 |

*FIG. 7B*

Machine Table - Machine ID 3, Type A

| Implement ID | Implement Type | Calibration ID | Calibration Value |
|---|---|---|---|
| 1 | A | 1 | 0.9 |
| 3 | A | 1 | 1.1 |

*FIG. 9A*

Implement Table - Implement ID 2, Type B

| Machine ID | Machine Type | Calibration ID | Calibration Value |
|---|---|---|---|
| 1 | A | 1 | 4.87 |
| 2 | B | 1 | 17 |

*FIG. 9B*

Machine Table - Machine ID 3, Type A

| Implement ID | Implement Type | Calibration ID | Calibration Value |
|---|---|---|---|
| | | | |
| | | | |

*FIG. 10A*

Implement Table - Implement ID 2, Type B

| Machine ID | Machine Type | Calibration ID | Calibration Value |
|---|---|---|---|
| 3 | A | 1 | 0.9 |
| 3 | A | 2 | 1.1 |
| 3 | A | 3 | 5 |

*FIG. 10B*

CALIBRATION SYNCHRONIZATION FOR MACHINE AND IMPLEMENT

BACKGROUND

The present invention relates to systems and methods for using a machine to operate a selectively couplable implement. For example, a farming machine such as a combine harvester can be selectively coupled to one or more different header implements and configured to operate the header implement, for example, by providing an operating energy (e.g., hydraulic flow, electrical current) to the header implement.

SUMMARY

In various different embodiments, the invention provides systems and method for coordinated operation of a machine and an implement. For example, a farming machine, such as a combine harvester, may be configured to operate with various different types of header implements. Each header implement may be specially designed for harvesting a particular type of crop. In some implementations, the combine harvester is configured to operate the header implement by providing mechanical energy (e.g., generated by an electric motor or combustion engine of the combine harvester) to the header implement. However, in order to provide precise control of the header implement, the combine harvester must be calibrated for each different header implement that is selectively coupled to the combine harvester.

One mechanism for calibrating a machine for a particular selectively coupleable implement is to perform a calibration procedure in which operating power and/or control signals transmitted between the machine and the implement are controllably varied while the operation of the implement is monitored (e.g., by sensors). Calibration data is generated for a particular machine-implement combination during the calibration procedure and is stored for later use in controlling the operation of the implement by the machine. However, this process can be time-consuming and may be impractical—particularly in situations where the implement attached to a particular machine is frequently changed.

In some embodiments described herein, the machine and the implement are each configured to include a non-transitory computer readable memory storing calibration data for prior machine-implement combinations. For example, the implement memory is configured to store calibration data for a plurality of different machines to which the implement was previously coupled. Similarly, the memory of the machine is configured to store calibration data for a plurality of different implements to which the machine was previously coupled. Accordingly, in some embodiments, when the machine is coupled to an implement, it determines whether calibration data is stored in the machine memory for the same particular implement. If so, the machine uses the stored calibration data to control the operation of the implement.

In some embodiments, if calibration data for the same implement is not already stored in the machine memory, the machine determines whether calibration data is stored in the machine memory for a different implement that is of the same implement type as the implement that is current coupled to the machine (e.g., a different implement of the same make/model) and controls the operation of the implement that is currently coupled to the machine based on the calibration data stored to the machine memory for one or more other implements of the same type.

In some embodiments, if calibration data for a different implement of the same type is not already stored in the machine memory, the machine determines whether calibration data is stored in the machine memory for a similar type of implement (e.g., a different model implement from the same manufacturer or an similar implement from a different manufacturer) and controls the operation of the implement that is currently coupled to the machine based on the calibration data stored to the machine memory for one or more other similar implements.

In some embodiments, if usable calibration data (e.g., calibration data for the same implement, a different implement of the same type, or a similar implement) is not stored on the machine memory, the machine will query the implement to determine whether usable calibration data is stored on the implement memory. The implement is configured to determine whether calibration data is stored in the implement memory for the same particular machine to which the implement is currently coupled, for a different machine of the same type, or a similar machine. If any such usable calibration data is stored on the implement memory, the implement is configured to respond to the query from the machine by transmitting the most relevant calibration data from the implement memory to the machine. The machine will then stored the calibration data received from the implement to the machine memory and use the received calibration data to control the operation of the implement that is currently coupled to the machine.

In some embodiments, if usable calibration data (e.g. calibration data for the same implement, a different implement of the same type, or a similar implement) is not stored in the machine memory or in the implement memory, the machine uses default calibration data to control the operation of the implement that is currently coupled to the machine. In some such embodiments, the machine is configured to initiate communication with a remote server to access and download default calibration data for the implement that is currently coupled to the machine.

In some embodiments, the machine is further configured to apply a feedback optimization mechanism while operating an implement based on stored calibration data. Using the feedback optimization, the machine determines whether the calibration data used by the machine for the implement that is currently coupled to the machine should be changed. If the feedback optimization produces new updated calibration data for the machine-implement combination, the new updated calibration data is stored to both the machine memory and the implement memory.

In one embodiment, the invention provides a method of calibrating a machine for operating with an implement that is selectively coupleable to the machine. Both the implement and the machine have non-transitory computer readable memories storing calibration data. The machine calibration data stored to the memory of the machine includes an identification of one or more specific implements and a calibration value for each of the one or more specific implements. In response to detecting a coupling between the machine and the implement, the machine determines whether the machine calibration data includes a calibration value corresponding to an identification of the implement that is selectively coupled to the machine. If so, the machine and the implement are operated based on the identified calibration value from the machine calibration data stored to the memory of the machine. If not, the machine determines a calibration value for the implement based at least in part on other calibration data stored by the machine memory and/or the implement memory. In some embodiments, the machine calibration data stored on the memory of the machine is also synchronized with the implement calibration data stored on the memory of the implement when the implement is selectively coupled to the machine.

Other aspects of the invention will become apparent by consideration of the detailed description and accompanying drawings.

BRIEF DESCRIPTION OF THE DRAWINGS

FIG. 2A is a first example of a machine table storing calibration data for a plurality of different implements in the machine memory of FIG. 1.

FIG. 2B is a first example of an implement table storing calibration data for a plurality of different machines in the implement memory of FIG. 1.

FIGS. 7A and 7B are a second example of a machine table and an implement table stored to the memory of the machine and the memory of the implement of FIG. 1, respectively, in which calibration data for the machine-implement combination is already stored in both the machine table and the implement table.

FIGS. 8A and 8B are a third example of a machine table and an implement table stored to the memory of the machine and the memory of the implement of FIG. 1, respectively, in which the implement is a new implement that does not have any previous calibration data stored in the implement memory.

FIGS. 9A and 9B are a fourth example of a machine table and an implement table stored to the memory of the machine and the memory of the implement of FIG. 1, respectively, for an implement and a machine that have not previously been coupled together.

FIGS. 10A and 10B are a fifth example of a machine table and an implement table stored to the memory of the machine and the memory of the implement of FIG. 1, respectively, in which the implement and the machine have been previously coupled, but the calibration data for the machine-implement combination is missing from the machine memory.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
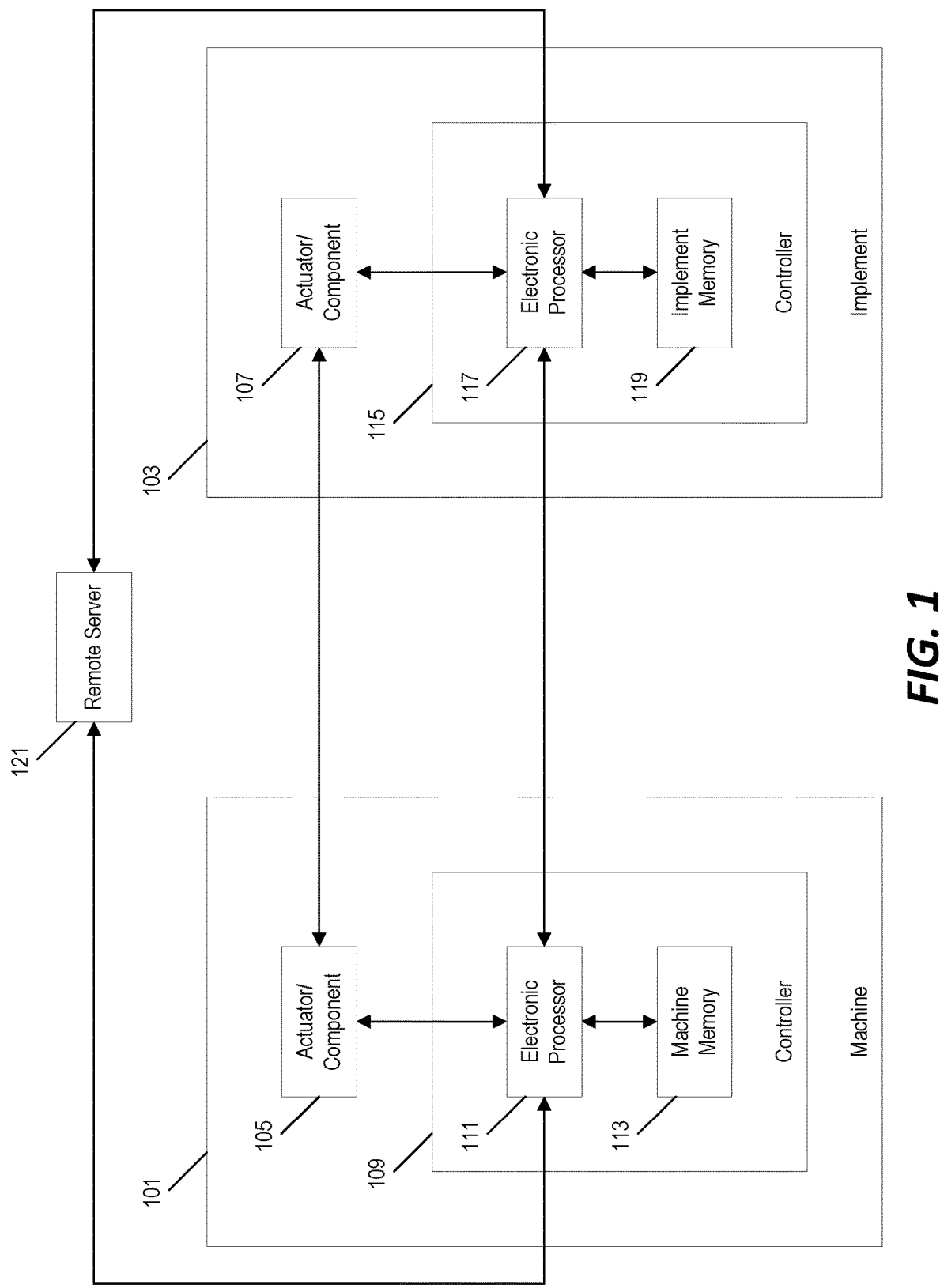
FIG. 1 is a block diagram of control systems for a machine and an implement selectively coupled to the machine according to one embodiment.

FIG. 1 illustrates an example of a control system for a machine 101 communicatively coupled to a control system for an implement 103. In the example of FIG. 1, the machine 101 and the implement 103 become communicatively coupled when the implement 103 is mechanically coupled to the machine 101 for the purposes of performing a task. The machine 101 and the implement 103 both include mechanism components and/or actuators 105, 107 that are controlled during performance of the task. For example, the machine 101 may include a combine harvester and the implement 103 may include a header designed for harvesting a particular type of crop. In some implementations, the actuator/component 105 of the combine harvester (e.g., the machine 101) may include a combustion engine or electric motor configured to provide mechanical operating power to the header (e.g. the implement 103) for turning a reel of the header that pushes the crops downward towards a cutter bar.

The machine 101 is equipped with a machine controller 109 that includes an electronic processor 111 and a non-transitory computer-readable memory 113. The machine memory 113 stores data (e.g., calibration data as discussed below) and computer-readable instructions that are executed by the electronic processor 111 to provide functionality of the machine controller 109. Similarly, the implement 103 is equipped with an implement controller 115 that includes an electronic processor 117 and a non-transitory computer-readable memory 119. The implement memory 119 also stores data (e.g., calibration data as discussed below) and computer-readable instructions that are executed by the electronic processor 117 to provide functionality of the implement controller 115.

The machine controller 109 and the implement controller 115 are configured to communicate electronically via a wired or wireless communication interface. In some implementations, as shown in the example of FIG. 1, the machine controller 109 and the implement controller 115 are also both configured to communicate with a remote server computer 121 via a wired or wireless communication interface. In some implementations where a wireless interface is used to communicate with the remote server 121, the machine controller 109 and/or the implement controller 115 may be configured to communicate with the remote server 121 during real-time operation of the machine 101 and implement 103. However, in other implementations (including implementations where a wired communication interface is used to communicate with the remote server 121, the machine controller 109 and/or the implement controller 115 may instead be configured to communicate with the remote server 121 only when the machine 101 is stationary (e.g., when the machine 101 is not operated to perform the task and is physically coupled to the remote server 121 via a wired communication interface). In still other implementations, the machine controller 109 and/or the implement controller 115 may be configured to communicate with the remote server 121 both during real-time operation of the machine 101 and the implement 103 and during "down time."

In the example of FIG. 1, the actuator/component 105 of the machine 101 and the actuator component 107 of the implement 103 are configured to interact with each other (either mechanically or electrically). However, in other implementations, the machine controller 109 is configured to communicate with and control the operation of the actuator/component 107 of the implement 103 either directly or through the implement controller 115. In either case, in order for the machine 101 and the implement 103 to operate properly together, the machine 101 and the implement 103 must be calibrated for each other. Calibration ensures that the control signals and/or mechanical operating power provided from the machine 101 to the implement 103 is properly adjusted to provide an intended operation of the actuator/component 107 of the implement 103 (e.g., a desired rotation speed of the header reel, a desired height of the cutter bar, etc.).

In some implementations, the machine 101 is configured to interchangeably operate with several different implements including, for example, different implements of the same type and different types of implements (e.g., different headers each configured to harvest a different crop and/or different headers from different manufacturers). Similarly, a single implement 103 may be configured to be used interchangeably by a number of different machines 101 including, for example, different machines of the same type and different types of machines. In order to ensure proper operation, calibration of each machine/implement combination is required.

Rather than require a complete calibration procedure to be performed each time a machine 101 is coupled to an implement 103, the machine memory 113 and the implement memory 119 in the example of FIG. 1 are each configured to store calibration data for previous machine/implement combinations. In particular, a "machine table" stored in the machine memory 113 stores a list of calibration data for a plurality of different implements to which the machine 101 has previously been coupled. Similarly, an "implement table" stored in the implement memory 119 stores a list of calibration data for a plurality of different machines to which the implement 103 has previously been coupled.

FIG. 2A illustrates an example of a "machine table" stored by the machine memory 113 of the machine 101. Each entry in the machine table defines a previously used/stored calibration value that is used to control an interaction/operation between the machine 101 and an implement. Each entry also identifies an "implement ID," an "implement type," and a "calibration ID" for the particular calibration value. The implement ID uniquely identifies a specific implement and is similar to a "serial number" or "vehicle identification number" (VIN). The "Implement Type" is indicative of the type of implement (e.g., a make/model of the implement). For some machine/implement combinations, a plurality of different calibration values may be required. Accordingly, each entry in the machine table in the example of FIG. 2A includes a calibration ID distinguishing between different types of calibration values. For example, in the harvester/header combination discussed above, the machine & implement may need calibration values for the rotational speed of the reel and for the height of the cutter bar. Accordingly, calibration values in the machine table of FIG. 2A identified with the calibration ID "1" may be calibration values for controlling the rotational speed of the reel while calibration values identified with the calibration ID "2" may be calibration values for controlling the height of the cutter bar.

FIG. 2B illustrates an example of an "implement table" stored by the implement memory 119 of the implement 103. Like the machine table of FIG. 2A, each entry in the implement table defines a previously used/stored calibration value that is used to control an interaction/operation between the implement 103 and a machine. Each entry also identifies a "machine ID," a "machine type," and a "calibration ID" for the particular calibration value. The machine ID uniquely identifies each specific implement and is similar to a "serial number" or VIN, the machine type is indicative of the type of machine (e.g., a make/model of the combine harvester), and the calibration ID distinguishes between different types of calibration values where multiple different calibration values may be used to control operations/interactions for a single machine/implement combination.

In cases where a particular machine 101 has been operated with a particular implement 103 before and calibration data for the combination of the machine 101 and the implement 103 is stored in the machine table of FIG. 2A, the calibration process is relatively straightforward. When the machine 101 is coupled to the implement 103, the machine controller 109 is configured to determine the Implement ID of the implement 103 by communicating with the implement controller 115. The machine controller 109 then accesses the calibration values for the specific implement 103 from the machine table of FIG. 2A and uses those calibration values to control the operation of the implement 103.

In some implementations, both the machine controller 109 and the implement controller 115 are configured to utilize the calibration values in order to control the coordinated operation of the machine 101 and the implement 103. Accordingly, in cases where a particular implement 103 has been operated with a particular machine 101 before and calibration data for the combination is stored in the implement table of FIG. 2B, the implement controller 115 simply accesses the appropriate calibration data from the implement table after determining the machine ID of the machine 101 by communicating with the machine controller 109.

In the specific example of FIGS. 2A and 2B, the machine table of FIG. 2A is stored by a machine 101 with a Machine ID of "3" and a Machine Type "A" and the implement table of FIG. 2B is stored by an implement 103 with an Implement ID of "3" and an Implement Type "B". When the machine 101 is coupled to the implement 103, the machine controller 109 communicates with the implement controller 115, determines the Implement ID for the implement 103 (Implement ID=3), and accesses the calibration value stored in the machine table for that Implement ID (calibration value=5). Similarly, the implement controller 115 communicates with the machine controller 109, determines the Machine ID for the machine 101 (Machine ID=3), and accesses the calibration value stored in the implement table for that Machine ID (calibration value=5). Accordingly, both the machine controller 109 and the implement controller 115 have the same calibration value to use in controlling the coordinated operation of the machine 101 and the implement 103.

However, in some cases the machine table and/or the implement table may not already have calibration data stored for a particular machine/implement combination. For example, this may be the first time that the machine 101 has been coupled to the particular implement 103 (e.g., a brand new machine or implement that has not been used before) or, due to a recent servicing or system error, some of the calibration data stored by the machine table and/or implement table may have been lost or deleted. In such case, the machine controller 109 and/or the implement controller 115 are configured to use other information stored in the machine table of the machine 101, in the implement table of the implement 103, and/or on the remote server 121 to determine appropriate calibration data. Also, while, in some implementations, both the machine controller 109 and the implement controller 115 are configured to utilize the calibration values in order to control the coordinated operation between the machine 101 and the implement 103, in some other implementations, the implement table is stored to the implement memory 119 only to facilitate the calibration and synchronization with the machine table (e.g. as described in the examples below).

Figure 3:
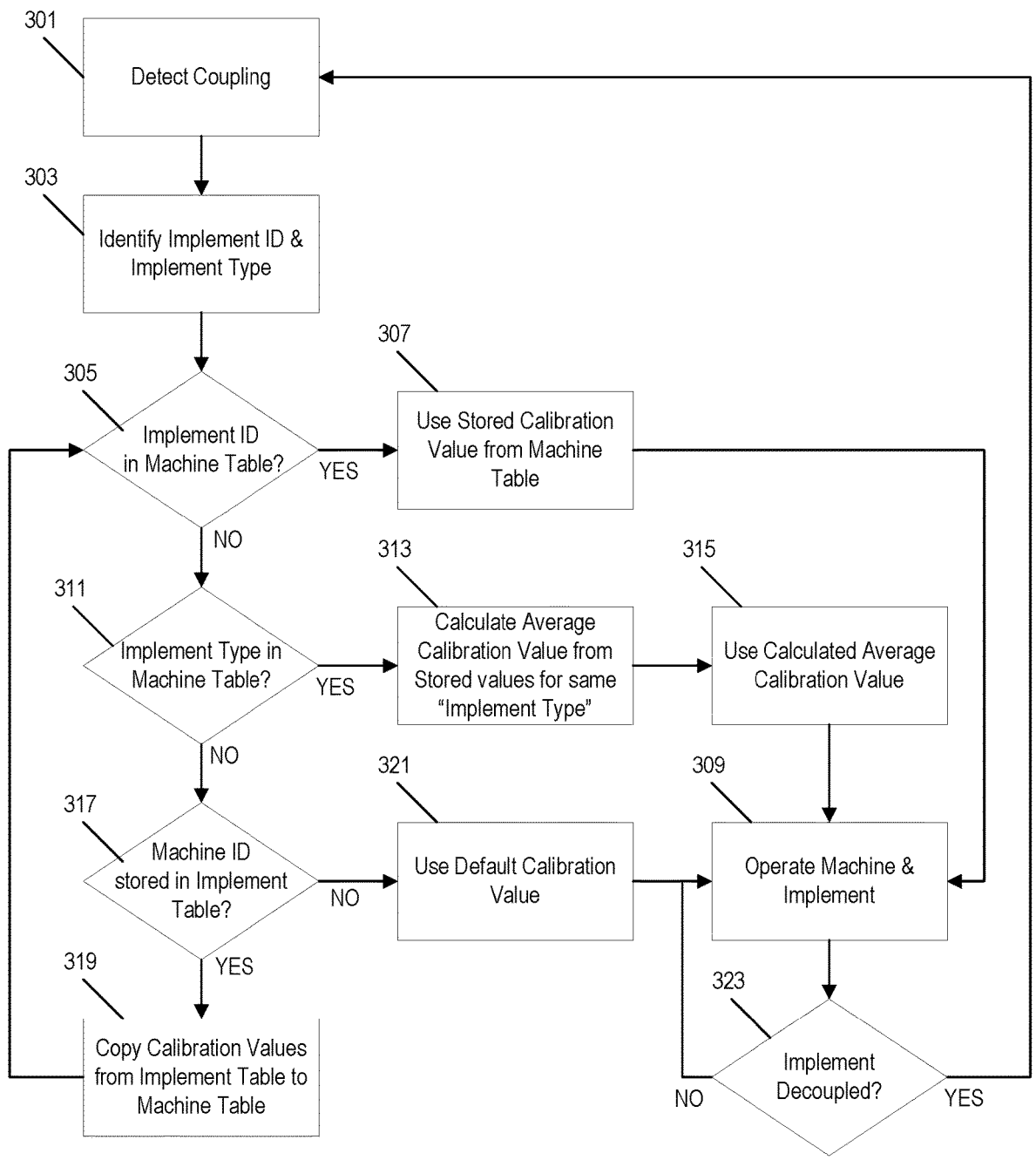
FIG. 3 is a flowchart of a method performed by the machine (coupled to an implement as shown in FIG. 1) for determining calibration data to be used by the machine in controlling the operation of the implement that is currently coupled to the machine.

FIG. 3 illustrates an example of a method performed by the machine controller 109 for determining appropriate calibration data when an implement 103 is coupled to the machine 101. In response to detecting a coupling with the implement (step 301), the machine controller 109 communicates with the implement controller 115 to identify the Implement ID and the Implement Type of the implement 103 (step 303). If calibration data for the Implement ID is already stored in the machine table (step 305), the machine controller 109 uses the stored calibration value(s) from the machine table (step 307) while operating the machine 101 and implement 103 (step 309) until the implement 103 is decoupled from the machine 101 (step 323).

However, if calibration data for the Implement ID is not stored in the machine table (step 305), the machine controller 109 determines whether calibration data for the Implement Type is stored in the Machine Table (step 311). As discussed above, calibration data for the same Implement Type, but for a different Implement ID, may be stored in the machine table if the machine 101 had previously been coupled to and calibrated for operation with a different implement of the same type. If the machine table includes calibration data for the same Implement Type (step 311), the machine controller 109 calculates an average calibration value from any stored calibration values in the machine table for the same Implement Type (step 313) and uses the calculated average calibration value (step 315) while operating the machine 101 (step 309) until the implement 103 is decoupled from the machine 101 (step 323).

For example, the Machine Table of FIG. 2A includes four entries for Implement Type A—two for calibration ID 1 and two for calibration ID 2. Accordingly, if the machine 101 were coupled to a new implement of Implement Type A, the machine controller 109 would the calculate calibration values for the new implement based on average of the values stored in the machine table. For example, the average calibration value for Calibration ID 1 and Implement Type A is 1.0 and the average calibration value for Calibration ID 2 and Implement Type A is 2.9. Accordingly, if the machine 101 were coupled to a new implement of Implement Type A, the machine controller 109 would use Calibration Value 1.0 and Calibration Value 2.9 for Calibration IDs 1 and 2, respectively, to control the operation of the machine with the implement.

If the Machine Table does not have any calibration data for the Implement ID or for the Implement Type, then the machine controller 109 queries the implement controller 115 to determine whether the Implement Table stores any calibration data for the Machine ID of the machine 101 (step 317). If any calibration data for the Machine ID is stored in the implement table (step 317), the relevant calibration values are copied from the Implement Table to the Machine Table and the new entry in the Machine Table are assigned the Implement ID and Implement Type of the implement 103 that is currently coupled to the machine 101 (step 319). The machine controller 109 is then able to access calibration data for the Implement ID now stored in the Machine Table (i.e., copied from the Implement Table) (steps 305 & 307).

Figure 4:
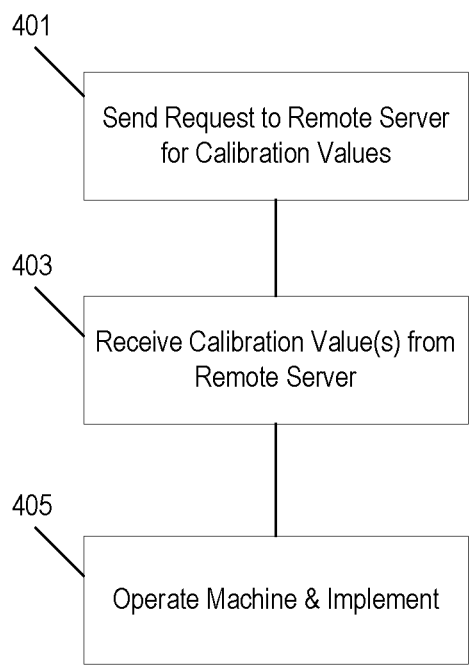
FIG. 4 is a flowchart of a method performed by the machine (coupled to an implement as shown in FIG. 1) for accessing default calibration data from a remote server in response to determining that usable calibration data is not stored in the machine memory or in the implement memory.

However, if the Implement Table of the implement 103 does not have any calibration data for the Machine Type of the machine 101, then the machine controller 101 uses a default calibration value (step 321) to control the operation of the machine 101 with the implement 103 (step 309) until the implement 103 is decoupled from the machine 101 (step 323). In various different implementations, the machine controller 109 can be configured to use different techniques to determine a set of default calibration values. However, in some implementations, as illustrated in FIG. 4, the machine controller 109 is configured to access default calibration values from a remote server 121. The machine controller 109 sends a request for calibration values for a particular Implement ID and/or Implement Type (step 401). The machine controller 109 receives one or more calibration values from the remote server 121 (step 403) and operates the machine & implement based on the calibration values received from the remote server 121 (step 405).

In some implementations, the remote server 121 may be configured to store a set of default calibration values for each of a plurality of combinations of Machine Type and Implement Type. In some such implementations, the stored default calibration values are determined by the manufacturers, by modelling, or by experimental testing. However, in other implementations, the remote server 121 may be configured to aggregating calibration values received from a plurality of different machines and implements (e.g., all machines and implements in a fleet) and to calculate default calibration values based on the aggregated data. Based on the aggregated data, the remote server 121 may be configured to identify all calibration values for each unique combination of Machine Type and Implement Type and to calculate averages of those calibration values that are then sent in response to a requests for default calibration values. For example, in response to receiving a request from the machine 101 (of Machine Type A) for default calibration data for an implement of Implement Type B (e.g., step 401 in FIG. 4), the remote server 121 may calculate an average of all the calibration values that have been aggregated for combinations of Machine Type A and Implement Type B and to send the calculated average value to the machine controller 109 as the "default" calibration value (step 403). In some implementations, the remote server 121 may be configured to use calculation techniques other than simple averaging to determine default calibration values may be configured to apply weighting to calibration data in the aggregated data that references the specific Machine ID or Implement ID involved in a particular request for default calibration values.

FIG. 3 is just one example of a mechanism for determining calibration values based on calibration data stored in a machine table, an implement table, and/or the remote server 121. Other implementations may include other mechanisms in addition to or instead of those particular steps in the example of FIG. 3. For example, although the machine table of FIG. 2A includes calibration values for only two Implement Types (A and B), in some implementations, a much larger number of different machine types might be configured for use with a particular machine. In some implementations, implements of different Implement Types may be similar enough that calibration data for one Implement Type might be useful as calibration data for another Implement Type. For example, although each make/model of header may be assigned a different "Implement Type," different headers from the same manufacturer may be constructed similarly and, therefore, similar calibration might be applicable to different types of headers from the same manufacturer. As another example, headers from different manufacturers may be configured to operate similarly and to collect the same crop and, therefore, similar calibration data might be application to similar types of headers from different manufacturers.

Accordingly, for a particular Implement Type, the machine controller 109 may be configured to identify one or more additional Implement Types that are classified as "similar" to that particular Implement Type. The machine controller 109 may be further configured to determine that the Machine Table does not have any stored calibration data for the particular Implement ID or for the particular Implement Type (e.g., steps 305 and 311 in the example of FIG. 3) and, in response, to determine whether the Machine Table has any stored calibration data for Implement Types that are classified as "similar" to the Implement Type of the implement 103. If calibration data for "similar" Implement Types is stored in the Machine Table, the machine controller 109 may be configured to calculate calibration values for the implement 103 based on the stored calibration data for the "similar" Implement Types (e.g., by calculating an average of stored calibrations values for those "similar" Implement Types).

In some implementations, the machine controller 109 is configured to update the Machine Table to include a new entry for the implement 103 in response to determining appropriate calibration data for the implement 103, for example, based on an average of stored calibration data for other implements of the same Implement Type or based on default calibration data received from the remote server 121. Additionally, in some implementations, the machine controller 109 may be configured to send the new calibration data to the implement controller 115 after creating a new entry for the implement 103 in the Machine Table and, in response to receiving the new entry from the machine controller 109, the implement controller 115 will create a corresponding new entry in the Implement Table.

Figure 5:
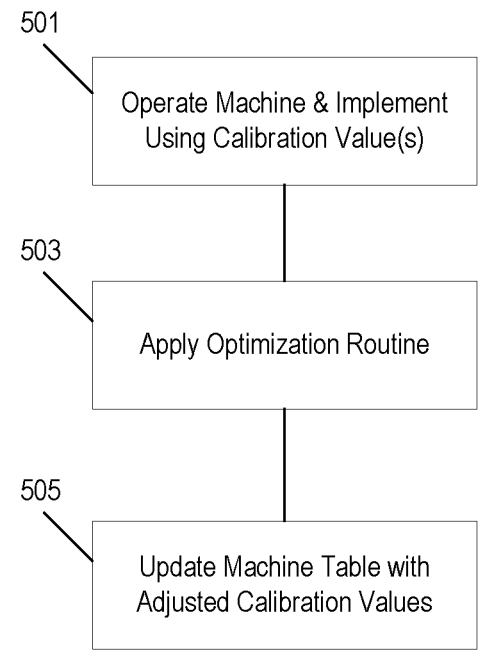
FIG. 5 is a flowchart of a method performed by the machine (coupled to an implement as shown in FIG. 1) for adjusting calibration data by applying a calibration optimization while operating the implement that is currently coupled to the machine.

The machine controller 109 may also be configured to apply additional optimization routines to improve the calibration data stored in the Machine Table and/or the Implement Table. For example, as illustrated in FIG. 5, the machine controller 109 may begin operating the machine and implement based on calibration values determined by the method of FIG. 3 (step 501). While operating the machine/implement, the machine controller 109 may also apply an optimization routine to continually adjust the calibration values based on feedback, for example, from one or more sensors to improve the control and operation of the implement coupled to the machine (step 503). As the calibration values are updated based on the feedback and the optimization routine, the calibration values stored in the Machine Table are also updated accordingly (step 505). In some implementations, where the calibration value used to control the machine/implement combination is determined, not based on a stored prior calibration value for the particular pair, but on a calculated value or default value, a "confidence" factor will be applied that may alter the way in which the machine controller 109 and/or the implement controller 115 uses the calibration value or the optimization routine.

Although the examples described above (e.g., in reference to FIG. 3) are performed by the machine controller 109, in some implementations, the implement controller 115 is configured to perform the same or similar operations to determine appropriate calibration values in addition to or instead of the machine controller 109 performing these operations. For example, in response to detecting a coupling with a machine 101 (i.e., step 301 of FIG. 3), the implement controller 115 will identify the Machine ID and Machine Type of the machine 101 (i.e., step 303) and determine whether the Machine ID is stored in the Implement Table (i.e., step 305). If not, the implement controller 115 will calculate one or more calibration values for the machine 101 based on an average of calibration values stored in the Implement Table for different machines of the same Machine Type.

Figure 6:
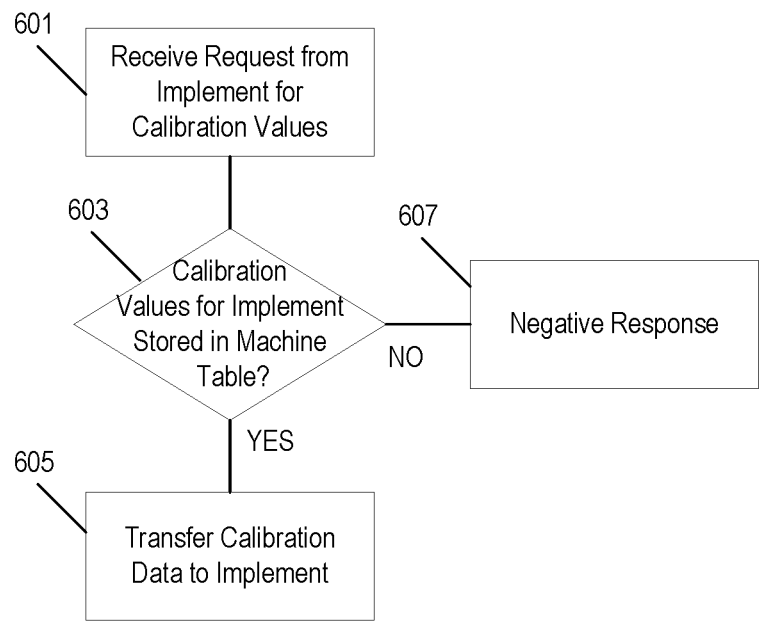
FIG. 6 is a flowchart of a method performed by the implement (coupled to a machine as shown in FIG. 1) in response to a request for calibration data received from a machine that is currently coupled to the implement.

Accordingly, in addition to sending queries to the implement controller 115 in order to determine whether calibration data for a particular Machine ID is stored in the Implement Table of the implement 101, the machine controller 109 may also receive similar requests from the implement controller 115. As illustrated in FIG. 6, in response to receiving a request from the implement controller 115 for calibration values (step 601), the machine controller 109 will determined whether calibration values for the Implement ID of the implement 103 are stored in the Machine Table (step 603). If so, the relevant calibration data from the Machine Table is transmitted by the machine controller 109 to the implement controller 115 (step 605). However, if no calibration data for the Implement ID of the implement 103 is stored in the Machine Table, then the machine controller 109 transmits a negative response to the implement controller 115 indicating that the requested data is not available in the Machine Table (step 607).

For implementations where both the machine controller 109 and the implement controller 115 are configured to determine appropriate calibration values for the machine/implement combination, the controllers 109, 115 may be configured to coordinate these determinations and to share information. For example, when the method of FIG. 3 is performed by the machine controller 109, the machine controller 109 may determine that the Machine Table does not store any calibration data for the Implement ID or the Implement Type of the implement 103. However, if the implement controller 115 is configured to perform a method similar to the method of FIG. 3 at the same time, the implement controller 115 may determine that the Implement Table stores calibration data for other machines of the same Machine Type as the machine 101. Accordingly, the machine controller 109 would not be able to calculate calibration data for the implement 103 based on stored calibration data in the Machine Table for other implements of the same Implement Type. However, the implement controller 115 would be able to calculate calibration data for the machine 101 based on stored calibration data in Implement Table for other machines of the same Machine Type as the machine 101.

After calculating calibration values for the machine 101 based on the average of the stored calibration values for other machines of the same Machine Type, the implement controller 115 would update the Implement Table to include a new entry for the Machine ID of the machine 101 with the calculated average calibration value(s) as the stored calibration value for the new entry. Then, when the machine controller 109 sends a request to the implement controller 115 querying whether the Implement Table stores any calibration value for the Machine ID of the machine 101 (step 317 of FIG. 3), the implement controller 115 will respond by transmitting to the machine controller 109 the calibration data from the newly created entry in the Implement Table.

Finally, the examples the described above (e.g., in reference to FIG. 3) describe copying calibration values from the Implement Table to the Machine Table (and vice versa) in response to specific determinations and requests sent by one controller to the other (i.e., step 319). However, in some implementations, the machine controller 109 and/or the implement controller 115 may be configured to shared calibration data with the other controller automatically in response to detecting the coupling of the implement 103 to the machine 101. Accordingly, in some implementations, the machine controller 109 may be configured to update the data in the Machine Table based on the data received from the Implement Table automatically before determining the appropriate calibration data for the machine/implement combination, thereby avoiding the need for specific requests transmitted between the controllers later.

FIGS. 7A & 7B, FIGS. 8A & 8B, FIGS. 9A & 9B, and FIGS. 10A & 10B present four additional examples of Machine Tables & Implement Tables that may be stored by the machine 101 and the implement 103, respectively. FIGS. 7A and 7B provide an example of a "routine" attachment in which the machine 101 and the implement 103 have been coupled and calibrated to each other before. According to the method of FIG. 3, the machine controller 109 will detect the coupling (step 301) and identify the implement 103 as Implement ID 2 and Implement Type B (step 303). The machine controller 109 checks the Machine Table (of FIG. 7A), finds a calibration value "5" for Implement ID 2 (step 305), and uses the accessed calibration value "5" to control the operation of the machine/implement combination (steps 307 & 309). Similarly, upon detecting the coupling of the implement 103 to the machine 101 (step 301), the implement controller 115 will identify the machine 101 as Machine ID 3 and Machine Type A (step 303). The implement controller 115 checks the Implement Table (of FIG. 7B), finds a calibration value "5" for Machine ID 3 (step 305), and uses the accessed calibration value "5" to control operation of the machine/implement combination (steps 307 & 309).

FIGS. 8A and 8B provide an example where the implement 103 is a new implement and, therefore, the Implement ID for the implement 103 is not stored in the Machine Table and no calibration data of any type is stored in the Implement Table. Upon detecting the coupling (step 301), the machine controller 109 identifies the implement 103 as Implement ID 2 and Implement Type B (step 303). The machine controller 109 discovers that there is no calibration data stored in the Machine Table for Implement ID 2 (step 305), but that there is calibration stored for other implements of Implement Type B (step 311). Therefore, the machine controller 109 calculates an average of the calibration values stored in the Machine Table for Implement Type B (average=5) (step 313). The machine controller 109 then updates the Machine Table to include a new entry for Implement ID 2 with a calibration value of "5" and uses that calculated average value as the calibration value for controlling the operation of the machine/implement combination (steps 315 and 309).

On the other hand, after detecting the coupling (step 301) and identifying the machine 101 as Machine ID 3 and Machine Type A (step 303), the implement controller 115 finds that there is no calibration data in the Implement Table for the Machine ID (step 305) or for the Machine Type (step 311). Accordingly, the implement controller 115 queries the machine controller 109 to determine whether calibration data is stored in the Machine Table for the Implement ID 2 of the implement 103 (step 317). If the machine controller 101 has already performed the method of FIG. 3 and updated the Machine Table (as described above in reference to FIG. 8A), then the machine controller will respond to the inquiry by providing the calibration value of "5" (i.e., the average calibration value from the Machine Table for other implements of Implement Type B as previously calculated by the machine controller 109). The implement controller 115 receives this calibration value from the machine controller 109, updates the Implement Table (step 319), and uses that calibration value for controlling the operation of the machine/implement combination (steps 307 and 309). However, if the machine controller 101 has not already performed the method of FIG. 3, the machine controller 101 will respond to the inquiry by indicating that there is no calibration data stored in the Machine Table for the Implement ID 2 and, therefore, the implement controller 115 will use a default calibration value (e.g., received from the remote server 121) to control the operation of the machine/implement combination (steps 321 and 309).

FIGS. 9A and 9B provide an example where the machine 101 and the implement 103 have been used before and, therefore, have calibration data stored in the Machine Table and the Implement Table, but the machine 101 and the implement 103 have not been used together. After detecting the coupling (step 301) and identifying the implement 103 as Implement ID 2 and Implement Type B (step 303), the machine controller 109 finds that there is no calibration data stored in the Machine Table for the Implement ID (step 305) or for the Implement Type (step 311). The machine controller 109 then transmits a query to the implement controller 115 to determine whether there is any calibration data stored in the Implement Table for the machine 101 (i.e., for Machine ID 3) (step 317). The reply from the implement controller 115 confirms that there is no calibration data stored in the Implement Table for Machine ID 3 and, therefore, the machine controller 109 retrieves a default calibration value (e.g., from the remote server 121) (step 321) to use while operating the machine/implement combination (step 309).

However, from the perspective of the implement controller 115, after detecting the coupling (step 301) and identifying the machine 101 as Machine ID 3 and Machine Type A (step 303), the implement controller 115 finds that there is no calibration data in the Implement Table for Machine ID 3 (step 305), but there is calibration data for another machine of Machine Type A (step 311). Accordingly, the implement controller 115 calculates an average of the calibration values in the Implement Table for the other machines of Machine Type A (i.e. average value=4.87) (step 313) and uses the calculated average value to control operation of the machine/implement combination (steps 315 and 309). As discussed above, in some implementations, the implement controller 115 would be configured to automatically transmit the calculated average calibration value to the machine controller 109 so that the machine controller 109 can use the same calibration value for controlling the operation of the machine/implement combination. Furthermore, in some implementations, the implement controller 115 is configured to update the Implement Table to add a new entry for the Machine ID 3 after calculating the average calibration values for other machines of Machine Type A. Accordingly, if the implement controller 115 has updated the Implement Table to include this new entry before receiving the request from the machine controller 109 (i.e., step 317), the implement controller 115 would respond to the query from the machine controller 109 by confirming that the Implement Table does have calibration data for Machine ID 3 and transmitting the calibration value to the machine controller 109 to be stored by the machine controller 109 in the Machine Table (i.e., step 319).

Finally, FIGS. 10A and 10B provide an example of a "forgotten" machine/implement combination. In this example, the implement 103 and the machine 101 have been used together before and the Implement Table includes calibration data for the machine 101. However, due, for example, to a system error, reprogramming, servicing, or other issues, the Machine Table of the machine 101 does not have any calibration data for the implement 103. Accordingly, upon detecting the coupling (step 301) and identifying the implement 103 as Implement ID 2 and Implement Type B (step 303), the machine controller 109 finds that the Machine Table does not have any calibration data for the Implement ID 2 (step 305) or for any other implements of Implement Type B (step 311). The machine controller 109 sends a query to the implement controller 115 to determine whether any calibration data for the Machine ID of the machine 101 (i.e., Machine ID 3) is stored in the Implement Table of implement 103 (step 317). Because the Implement Table includes three separate calibration values for Machine ID 3 (i.e. the specific machine 101 that is now coupled to the implement 103), the implement controller 115 responds by transmitting all of the calibration data for Machine ID 3 to the machine controller 109. The machine controller 109 updates the Machine Table based on this received calibration data from the implement controller 115 (step 319) and uses the stored calibration data that is now included in the Machine Table to control the operation of the machine/implement combination (steps 307 and 309).

Conversely, when the implement controller 115 detects the coupling (step 301) and identifies the machine 101 as Machine ID 3 and Machine Type A (step 303), the implement controller 115 finds calibration data for Machine ID 3 already stored in the Implement Table (step 305). Accordingly, the implement controller 115 simply uses the calibration data for Machine ID 3 from the Implement Table to control the operation of the machine/implement combination (step 307 and 309).

In the discussion of the examples of FIGS. 7A through 10B, the calibration data access and synchronization is performed by both the machine controller 109 and the implement controller 115. However, as noted above, in some implementations, only one of the machine controller 109 or the implement controller 115 might be configured to access and synchronize the calibration data. Furthermore, in some implementations, the machine controller 109 and the implement controller 115 may be configured to use different methods and mechanisms for synchronizing and sharing calibration data to be used in controlling the operation of the machine/implement combination.

Accordingly, the invention provides, among other things, systems and methods for controlling operation of a machine that is selectively coupled to an implement based on stored calibration data for the specific implement and calibration data stored for other implements of the same type. Other features and advantages of the invention are set forth in the following claims.

What is claimed is:

1. A method of calibrating a machine for operating with an implement that is selectively coupleable to the machine, the method comprising:
   detecting a coupling between the machine and the implement selectively coupled to the machine;
   electronically receiving, from the implement in response to detecting the coupling, an identification of the implement;
   accessing machine calibration data from a memory of the machine, wherein the machine calibration data includes an identification of one or more specific implements and a calibration value for each of the one or more specific implements;
   identifying, from the machine calibration data, the calibration value corresponding to the received identification of the implement;
   operating the machine and the implement based on the identified calibration value;
   electronically receiving, by the implement from the machine, an identification of the machine;
   accessing, by the implement, the implement calibration data from the memory of the implement, wherein the implement calibration data includes an identification of one or more specific machines and a calibration value for each of the one or more specific machines;
   determining, by the implement, whether the implement calibration data includes a calibration value corresponding to the identification of the machine to which the implement is selectively coupled;
   calculating a new calibration value for the machine in response to determining that the implement calibration data does not include the calibration value corresponding to the identification of the machine;
   updating the implement calibration data to include the new calibration value for the machine and the identification of the machine to which the implement is selectively coupled; and
   synchronizing the machine calibration data stored on the memory of the machine with implement calibration data stored on a memory of the implement.

2. The method of claim 1, wherein synchronizing the machine calibration data with the implement calibration data includes synchronizing the machine calibration data with the implement calibration data in response to detecting the coupling.

3. The method of claim 1, further comprising determining whether the machine calibration data from the memory of the machine includes a calibration value corresponding to the identification of the implement that is selectively coupled to the machine.

4. The method of claim 3, wherein synchronizing the machine calibration data with the implement calibration data includes
   transmitting a calibration data query to the implement in response to determining that the machine calibration data does not include the calibration value corresponding to the identification of the implement that is selectively coupled to the machine,
   receiving, from the implement in response to the calibration data query, a calibration value corresponding to the machine, and
   updating the machine calibration data to include the calibration value received from the implement in response to the calibration data query and an identification of the implement.

5. The method of claim 1, wherein synchronizing the machine calibration data with the implement calibration data includes
   transmitting the new calibration value for the machine from the implement to the machine; and
   updating the machine calibration data to include the new calibration value for the machine and an identification of the implement that is selectively coupled to the machine.

6. A method of calibrating a machine for operating with an implement that is selectively coupleable to the machine, the method comprising:
   detecting a coupling between the machine and the implement selectively coupled to the machine;
   electronically receiving, from the implement in response to detecting the coupling, an identification of the implement;
   accessing machine calibration data from a memory of the machine, wherein the machine calibration data includes an identification of one or more specific implements and a calibration value for each of the one or more specific implements;

determining whether the machine calibration data from the memory of the machine includes a calibration value corresponding to the identification of the implement that is selectively coupled to the machine;

identifying, from the machine calibration data, the calibration value corresponding to the received identification of the implement and operating the machine and the implement based on the identified calibration value in response to determining that the machine calibration data from the memory of the machine includes the calibration value corresponding to the identification of the implement that is selectively coupled to the machine;

identifying an implement type of the implement that is selectively coupled to the machine, wherein the machine calibration data stored to the memory of the machine includes an identification of the implement type for each of the one or more specific implements;

calculating a new calibration value for the implement in response to determining that the machine calibration data does not include the calibration value corresponding to the identification of the implement that is selectively coupled to the machine, wherein the new calibration value is calculated based at least in part on one or more calibration values in the machine calibration data corresponding to implements of the same implement type as the implement that is selectively coupled to the machine; and synchronizing the machine calibration data stored on the memory of the machine with implement calibration data stored on a memory of the implement.

7. The method of claim 6, wherein calculating the new calibration value includes calculating the new calibration value as an average of the one or more calibration values in the machine calibration data corresponding to the implements of the same implement type as the implement that is selectively coupled to the machine.

8. The method of claim 6, further comprising:

determining whether the machine calibration data from the memory of the machine includes any calibration values corresponding to implements of the same implement type as the implement that is selectively coupled to the machine; and determining one or more implement types that are classified as similar to the implement type of the implement that is selectively coupled to the machine, wherein, in response to determining that the machine calibration data does not include any calibration values corresponding to implements of the same implement type as the implement that is selectively coupled to the machine, the new calibration value is calculated based at least in part on one or more calibration values in the machine calibration data corresponding to implements of the one or more implement types that are classified as similar to the implement type of the implement that is selectively coupled to the machine.

9. A system for operating a machine with an implement that is selectively coupleable to the machine, the system comprising an electronic machine controller configured to:

detect a coupling between the machine and the implement selectively coupled to the machine;

electronically receive, from the implement in response to detecting the coupling, an identification of the implement;

access machine calibration data from a memory of the machine, wherein the machine calibration data includes an identification of one or more specific implements and a calibration value for each of the one or more specific implements;

determine whether the machine calibration data from the memory of the machine includes a calibration value corresponding to the identification of the implement that is selectively coupled to the machine;

identify, from the machine calibration data, the calibration value corresponding to the received identification of the implement and operate the machine and the implement based on the identified calibration value in response to determining that the machine calibration data from the memory of the machine includes the calibration value corresponding to the identification of the implement that is selectively coupled to the machine;

identify an implement type of the implement that is selectively coupled to the machine, wherein the machine calibration data stored to the memory of the machine includes an identification of the implement type for each of the one or more specific implements;

calculate a new calibration value for the implement in response to determining that the machine calibration data does not include the calibration value corresponding to the identification of the implement that is selectively coupled to the machine, wherein the new calibration value is calculated based at least in part on one or more calibration values in the machine calibration data corresponding to implements of the same implement type as the implement that is selectively coupled to the machine; and synchronize the machine calibration data stored on the memory of the machine with implement calibration data stored on a memory of the implement.

10. The system of claim 9, wherein the electronic machine controller is configured to synchronize the machine calibration data with the implement calibration data by receiving a calibration value from the implement corresponding to the machine, and updating the machine calibration data to include the calibration value received from the implement and an identification of the implement.

11. The system of claim 9, wherein the electronic machine controller is configured to synchronize the machine calibration data with the implement calibration data by synchronizing the machine calibration data with the implement calibration data in response to detecting the coupling.

12. The system of claim 9, wherein the electronic machine controller is further configured to:

determine whether the machine calibration data from the memory of the machine includes any calibration values corresponding to implements of the same implement type as the implement that is selectively coupled to the machine; and determine one or more implement types that are classified as similar to the implement type of the implement that is selectively coupled to the machine, wherein, in response to determining that the machine calibration data does not include any calibration values corresponding to implements of the same implement type as the implement that is selectively coupled to the machine, the new calibration value is calculated based at least in part on one or more calibration values in the machine calibration data corresponding to implements of the one or more implement types that are classified as similar to the implement type of the implement that is selectively coupled to the machine.

* * * * *